United States Patent [19]
Um et al.

[11] Patent Number: 5,260,798
[45] Date of Patent: Nov. 9, 1993

[54] PIXEL INTENSITY MODULATOR

[75] Inventors: Gregory Um, Torrance; Andrei Szilagyi, Rancho Palos Verdes, both of Calif.

[73] Assignee: Aura Systems, Inc., El Segundo, Calif.

[21] Appl. No.: 885,727

[22] Filed: May 18, 1992

Related U.S. Application Data

[63] Continuation-in-part of Ser. No. 448,748, Dec. 11, 1989, Pat. No. 5,126,836, which is a continuation-in-part of Ser. No. 429,987, Nov. 1, 1989, Pat. No. 5,150,205.

[51] Int. Cl.$^5$ ............................ H04N 9/31; H04N 5/74
[52] U.S. Cl. ...................................... 358/233; 358/62; 359/618; 359/209; 345/20
[58] Field of Search ................... 358/60, 61, 62, 63, 358/64, 231–234; 340/794, 795; 359/618, 572, 573, 196, 197, 209, 223, 224, 242, 243, 849, 847, 846; 250/227.26; 385/17.2, 53

[56] References Cited

U.S. PATENT DOCUMENTS

| | | | |
|---|---|---|---|
| 4,150,396 | 4/1979 | Hareng et al. | 358/60 |
| 4,441,791 | 4/1984 | Hornbeck | 350/360 |
| 4,566,935 | 1/1986 | Hornbeck | 156/625 |
| 4,571,603 | 2/1986 | Hornbeck | 346/160 |
| 4,615,595 | 10/1986 | Hornbeck | 353/122 |
| 4,638,309 | 1/1987 | Ott | 340/85 |
| 4,680,579 | 7/1987 | Ott | 340/783 |
| 4,705,361 | 11/1987 | Frazier et al. | 350/355 |
| 4,710,732 | 12/1987 | Hornbeck | 332/7.51 |
| 4,856,863 | 8/1989 | Sampsell et al. | 350/96.16 |
| 4,859,012 | 8/1989 | Cohn | 350/96.24 |
| 4,956,619 | 9/1990 | Hornbeck | 340/4.3 |
| 5,028,939 | 7/1991 | Hornbeck et al. | 343/160 |
| 5,035,475 | 7/1991 | Lee et al. | 359/629 |
| 5,060,058 | 10/1991 | Goldenberg et al. | 358/60 |

FOREIGN PATENT DOCUMENTS 47180 2/1989 Japan .

OTHER PUBLICATIONS

J. A. van Raalte, Television—A New Schlieren Light Valve for Projection Displays; Applied Optics, vol. 9, No. 10, p. 2225.
R. Noel Thomas; The Mirror—Matrix Tube: A novel Light Valve for Projection Displays; IEEE Transactions on Electron Devices, vol. ED-22; No. 9; Sep. 1975 p. 765.
K. Petersen; Dynamic Micromechanics on Silicon: Techniques and Devices; IEEE Transactions on Electron Devices, vol. ED-25, No. 10 Oct. 1978 p. 1241.
A. Lakatas; T.V. Projection Display Using an Amorphous—Se—Type Ruticon Light Valve, IEEE Transactions on Electron Devices, vol. ED-24, No. 7, Jul. 1977 p. 930.
K. Petersen; Micromechanical Light Modulator Array Fabricated on Silicon, Applied Physics Letters, vol. 31, No. 8, Oct. 1977 p. 521.

*Primary Examiner*—James J. Groody
*Assistant Examiner*—Glenton B. Burgess
*Attorney, Agent, or Firm*—Anthony T. Cascio; Lisa A. Clifford

[57] ABSTRACT

An apparatus to modulate the intensity of a pixel displayed on a screen focused optical energy from a broadband source onto a reflective first face of a planar member. The first face is disposed in said first propagation path at a selected angle thereto to direct optical energy along a second propagation path. A planar mirror is disposed in the second propagation path. The plane of the mirror is actuatable to orientate the mirror within a range of angles to said second propagation path between a first angle limit and a second angle limit. A second focusing lens disposed in the second propagation path to focus optical energy reflected from the first face onto the mirror. The mirror when at the first angle limit reflects optical energy along the second propagation path to the first face and when at the second angle limit reflects optical energy along a third propagation path adjacent an edge of the planar member and external thereto so that flux of optical energy along the third propagation path is a function of the present orientation of the mirror between the first angle limit and the second angle limit. The screen is disposed in the third propagation path wherein the flux of optical energy along the third propagation path when focused on the screen determines the intensity of the pixel.

4 Claims, 2 Drawing Sheets

PIXEL INTENSITY MODULATOR

RELATED APPLICATION DATA

The present application is a continuation-in-part of commonly owned, co-pending application Ser. No. 07/448,748, filed Dec. 11, 1989, which is a continuation-in-part of Ser. No. 07/429,987, filed Nov. 1, 1989, each of which is incorporated herein by reference.

FIELD OF THE INVENTION

The present invention relates generally to optical projection systems and more particularly to a novel display projection system using an actuated mirror array to effect modulation of pixel intensity.

BACKGROUND OF THE INVENTION

Actuated mirror arrays are useful for one component in the modulation of light intensity wherein the beam reflected from each mirror is modulated by the flux of such beam passing through a slit aperture, as disclosed in Ser. No. 07/429,987 and Ser. No. 07/448,748. As described therein, the flux is controlled by the orientation of the mirror relative to the aperture. A piezoelectric actuator has been disclosed for actuating each mirror in response to an electrical signal applied to each actuator. The electrical signal is commensurate with the degree of modulation desired. The control circuitry for the actuators has been described in Ser. No. 07/504,125, which is incorporated herein by reference. Several examples of piezoelectric actuators and mirror arrays constructed therefrom are disclosed in Ser. No. 07/494,579.

SUMMARY OF THE INVENTION

According to the present invention, an apparatus to modulate the intensity of a pixel displayed on a screen focuses optical energy from a broadband source onto a reflective first face of a planar member. The first face is disposed in said first propagation path at a selected angle thereto to direct optical energy along a second propagation path. A planar mirror is disposed in the second propagation path. The plane of the mirror is actuatable to orientate the mirror within a range of angles to said second propagation path between a first angle limit and a second angle limit. A second focusing lens disposed in the second propagation path to focus optical energy reflected from the first face onto the mirror. The mirror when at the first angle limit reflects optical energy along the second propagation path to the first face and when at the second angle limit reflects optical energy along a third propagation path adjacent an edge of the planar member and external thereto so that flux of optical energy along the third propagation path is a function of the present orientation of the mirror between the first angle limit and the second angle limit. The screen is disposed in the third propagation path wherein the flux of optical energy along the third propagation path when focused on the screen determines the intensity of the pixel.

In another aspect of the present invention, a novel actuator fabricated from either piezoelectric or electrostrictive material is described.

These and other objects, advantages and features of the present invention will become readily apparent to those skilled in the art from a study of the following Description of an Exemplary Preferred Embodiment when read in conjunction with the attached Drawing and appended claims.

DESCRIPTION OF AN EXEMPLARY PREFERRED EMBODIMENT

Figure 1:
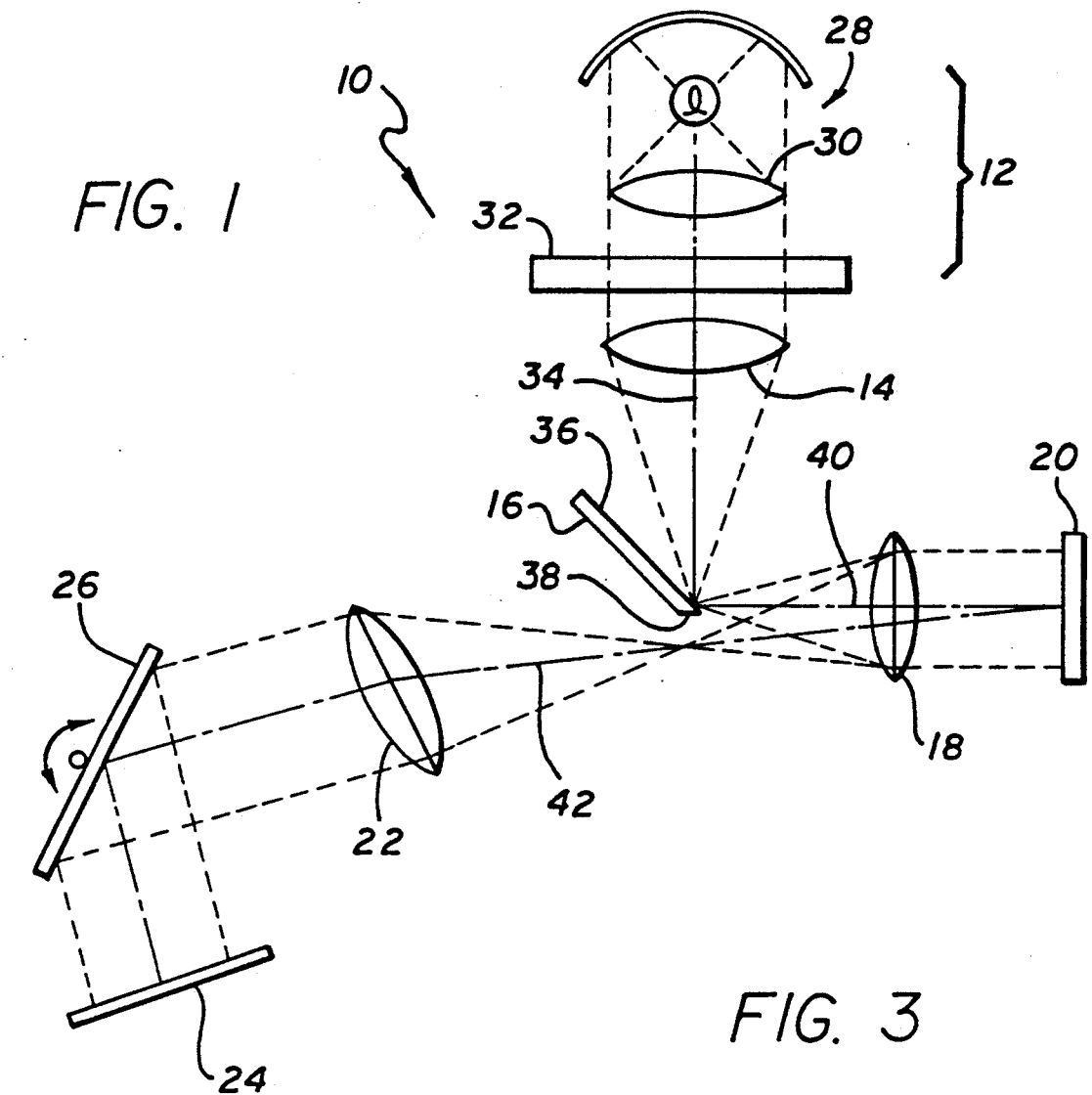
FIG. 1 is a schematic view of a novel display projection system constructed according to the principles of the present invention.
Figure 2A:
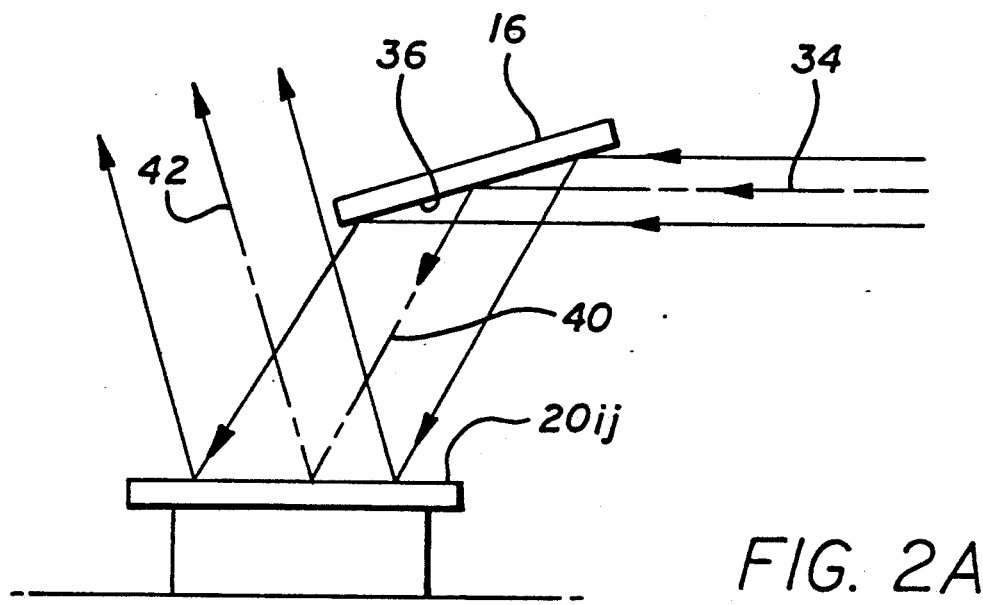
FIG. 2A is an enlarged schematic of a portion of FIG. 1.

Referring now to the FIG. 1 and FIG. 2A, there is shown a display projection system 10 constructed according to the principles of the present invention. The scene projector 10 includes a source 12 of optical energy, a first focusing lens 14, a planar member 16, a second focusing lens 18, an actuated mirror array 20, a collimating lens 22 and a screen 24. The system 10 may also include a scanning mirror 26.

The source 12 may include any broadband source 28 of energy. The energy may also be in the spectrum long wave infrared (LWIR) to ultraviolet (UV). The source may also include a collimating lens 30 and a filter 32. The collimating lens 30 collimates the energy from the source 28 and directs it to the plane of the filter 32. The filter 32 is useful for filtering unwanted wavelengths from the optical energy. For example for a video projector, the filter 32 may remove infrared (heat) and ultraviolet whereas if an infrared scene projector is desired, the filter 32 will remove the visible spectrum.

The first focusing lens 14 is disposed intermediate the planar member 16 and the source 12. The first focusing lens 14 focuses the optical energy emitted from the source 12 along a first propagation path 34 onto a first face 36 of the planar member 16. The point at which the energy is focused is adjacent an edge 38 of the planar member, as best seen in FIG. 1. The first face 36 of the planar member 16 is optically reflective.

The planar member 16 is disposed at a selected angle with respect to the first propagation path 34 so that optical energy is reflected from the first face along a second propagation path 40. The optical energy along the second propagation path 40 fans out until it is incident on the second focusing lens 18. The second lens 18 collimates the optical energy along the second path. The collimated energy is then incident on the actuated mirror array 20.

With particular reference to FIG. 2A, each mirror $20_{ij}$ of the mirror array 20 is disposed in the second propagation path 40. The orientation of each mirror $20_{ij}$ determines the intensity of a respective pixel to be displayed at the screen 24. For example, if the plane of a particular mirror $20_{ij}$ is normal to the second propagation path 40, the optical energy reflected therefrom will return to the planar member 16 along the second propagation path 40. More particularly, the second lens 18 will focus the energy reflected from the mirror $20_{ij}$ surface back to its original point of incidence on the reflective first face 36. This orientation of the mirror $20_{ij}$ defines a first angle limit.

However, if the plane of the mirror $20_{ij}$ is offset from the normal to the second propagation path 40, the reflected optical energy will be along a path diverging from the second propagation path 40. This divergent energy is focused by the second lens 18 at a point offset from the original point of incidence on the reflective first face 36 so that some energy is not blocked by the planar member 16 but continues pass the edge 38. Accordingly, an increasing offset of the plane of the mirror $20_{ij}$ will decrease the flux of the optical energy returning to the original point of incidence on the first face 36 and thereby increase the flux of optical energy going past the edge 38.

When the mirror $20_{ij}$ is at its full actuated position, defining a second angle limit, none of the reflected energy therefrom returns to the original point of incidence on the reflective face 36 and all of it passes the edge 38. This energy propagates along a third propagation path 42. Therefore, the present orientation of the mirror $20_{ij}$ between the first angle limit and the second angle limit determines the flux energy along the third propagation path and hence the intensity of a pixel developed from the energy reflected from such mirror $20_{ij}$.

The collimating lens 22 is disposed in the third propagation path to eliminate the fan out of the energy along the third propagation path 42 and collimate it for display on the screen 24. The screen 24 may either display the optical energy incident thereon or be an array of photodetector elements wherein each photodetector uses the optical energy incident thereon as information for the further development of a corresponding pixel. A scanning mirror 26 may be disposed between the collimating lens 22 and screen 24 for scanning a column (or row) of pixels if the mirror array 20 is a M×1 array, where M is the number of rows (or columns). If the mirror array 20 is a M×N array, the full array of pixels is displayed and scanning is not necessary.

Figure 2B:
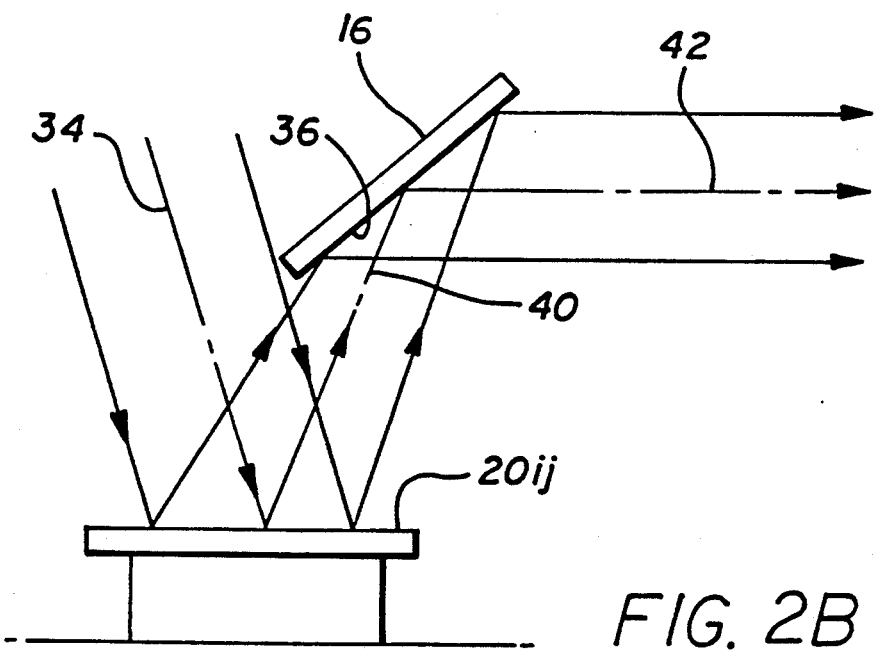
FIG. 2B is a view similar to FIG. 2A showing an alternative embodiment thereof.

Referring to FIG. 2B, there is shown an alternate arrangement of the mirror array 20 and the planar member 16. The optical energy along the first propagation path is first incident on the mirror $20_{ij}$. The orientation of the mirror $20_{ij}$ at its first angle limit, normal to the first propagation path, will return the optical energy to the source. When the orientation of the mirror $20_{ij}$ is at its second angle limit, the entire flux of the optical energy will be directed along the second propagation path 40 and reflected from the reflective face 36 as a full intensity pixel along the third propagation path 42. When the mirror $20_{ij}$ is between the angle limits the amount of flux reaching the reflective face 36 is accordingly controlled for intensity modulation according to the above described principles.

Figure 3:
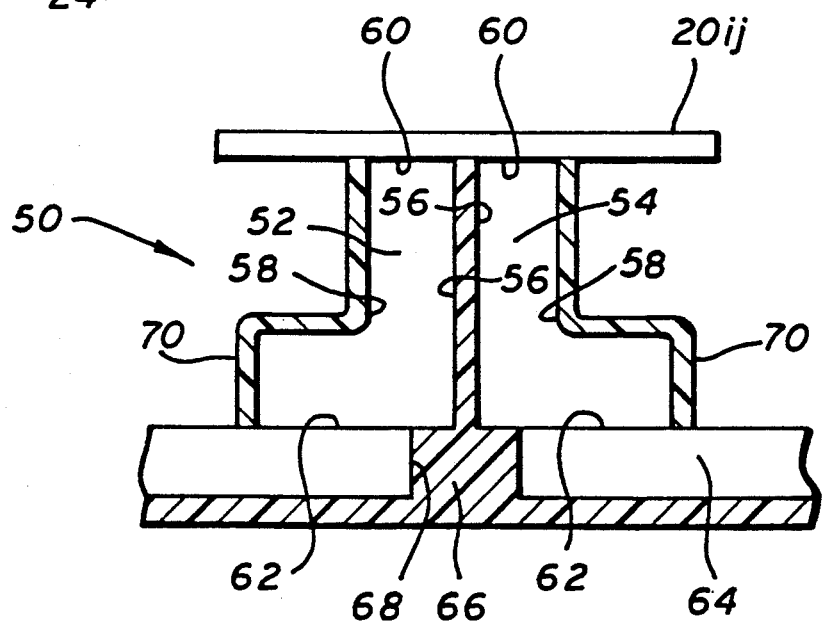
FIG. 3 is a cross-sectional view of one mirror actuator of FIG. 1.

Referring to FIG. 3, there is shown an embodiment of an actuator 50 for the mirror $20_{ij}$. The actuator 50 includes a first member 52 and a second member 54. Each member 52, 54 includes a first side surface 56, a second side surface 58, a top surface 60 and a bottom surface 62. The bottom surface 62 of each member 52, 54 is mounted to a substrate 64. The mirror $20_{ij}$ is mounted to the top surface 60 of each member 52,54.

The first side surface 56 of each member 52,54 are bonded face to face by a conductive epoxy which is electrically connected to electrically conductive metallization 66 along the bottom of the substrate 64 and within the via 68. The metallization 66 forms a common connection for all mirrors $20_{ij}$ in the array 20. A metallization 70 is disposed on each second side surface 58 and isolated from each other metallization 70. The members 62,64 are formed from either piezoelectric or electrostrictive material.

Each member 62,64 has a polarization selected so that a voltage of a first polarity applied to its second side surface 58 causes the member 62,64 to contract between its top surface 60 and its bottom surface 62. The voltage when applied to the second side surface 58 the first member 62 causes the mirror $20_{ij}$ to tilt toward the first member 62 due to its contraction and the dimensional constancy of the second member 64. Similarly, the voltage when applied to the second side surface 58 of the second member 64 causes the mirror $20_{ij}$ to tilt toward the second member 64 due to its contraction and the dimensional constancy of the first member 62. The voltage is applied across the second side surface 58 through the metallization 70.

To obtain a greater degree of tilt, the voltage may be simultaneously applied to the second side surface 58 of each member 62,64 but of opposite polarity at each side surface 58. This will cause one of the members 62,64 to contract and the other of the member 62,64 to expand. This arrangement requires that each member be piezoelectric since electrostrictive only contracts independent of polarity.

Titling may also be accomplished with one of the members being replaced by a thick layer of metallization which acts as the common connection. The voltage applied to the opposite face of the remaining member will cause the contraction or expansion, thereby causing the top surface to tilt since the metallization remains dimensionally constant.

There has been described hereinabove a novel display projection system which uses an actuated mirror array. Those skilled in the art may now make numerous uses of and departures from the above described embodiments without departing from the inventive concepts disclosed herein. Accordingly, the present invention is to be defined solely by the scope of the following claims.

I claim:

1. An apparatus to modulate the intensity of a pixel displayed on a screen comprising:

a source of optical energy;

a planar member having at least a first face and an edge, said first face being optically reflective;

a first focusing lens to focus said optical energy from said source along a first propagation path, said first face being disposed in said first propagation path at a selected angle thereto to direct said optical energy along a second propagation path;

an actuatable planar mirror disposed in said second propagation path wherein the plane of said actuatable mirror is selectively positioned within a range of angles to said second propagation path between a first angle limit and a second angle limit; and a second focusing lens disposed in said second propagation path to focus optical energy reflected from said first face onto said mirror, said mirror when at said first angle limit reflecting optical energy along said second propagation path to said first face and when at said second angle limit reflecting optical energy along a third propagation path adjacent said edge external to said member so that flux of optical energy along said third propagation path is a function of the present orientation of said mirror between said first angle limit and said second angle limit, said screen being disposed in said third propagation path wherein the flux of optical energy along said third propagation path when focused on said screen determines the intensity of said pixel.

2. An apparatus as set forth in claim 1 further comprising a collimating lens disposed between said mirror and said screen to focus energy propagating along said third propagation path on said screen.

3. An apparatus to modulate the intensity of a pixel displayed on a screen comprising:

a source of optical energy;

a first focusing lens to focus said optical energy from said source along a first propagation path;

an actuatable planar mirror disposed in said first propagation path wherein the plane of said actuatable mirror is selectively positioned within a range of angles to said first propagation path between a first angle limit and a second angle limit, said mirror when at said first angle limit reflecting said optical energy along said first propagation path to said source and when at said second angle limit reflecting said optical energy along a second propagation path;

a planar member disposed at a selected angle to said second propagation path and having at least a first face and and an edge, said first face being optically reflective, said second propagation path being adjacent said edge and incident on said first face so that flux of optical energy incident on said first face is a function of the present orientation of said mirror between said first angle limit and said second angle limit, said first face reflecting the incident flux of optical energy along a third propagation path; and a second focusing lens disposed in said second propagation path to focus the optical energy reflected from said mirror in said second propagation path onto said first face, said screen being disposed in said third propagation path wherein the flux of optical energy along said third propagation path when focused on said screen determines the intensity of said pixel.

4. An apparatus as set forth in claim 3 further comprising a collimating lens disposed between said first face and said screen to focus energy propagating along said third propagation path on said screen.

* * * * *